United States Patent
Matsumoto et al.

(10) Patent No.: US 6,893,997 B2
(45) Date of Patent: May 17, 2005

(54) EXHAUST GAS PURIFYING CATALYST AND METHOD FOR PURIFYING EXHAUST GAS

(75) Inventors: Takeshi Matsumoto, Himeji (JP); Makoto Horiuchi, Himeji (JP); Tatsuya Yoshikawa, Himeji (JP)

(73) Assignees: CT Co., Ltd., Osaka (JP); International Catalyst Technology Inc., Ridgefield Park, NJ (US)

(*) Notice: Subject to any disclaimer, the term of this patent is extended or adjusted under 35 U.S.C. 154(b) by 208 days.

(21) Appl. No.: 09/883,641

(22) Filed: Jun. 18, 2001

(65) Prior Publication Data

US 2002/0013228 A1 Jan. 31, 2002

(30) Foreign Application Priority Data

Jun. 20, 2000 (JP) ......................................... 2000-185257

(51) Int. Cl.[7] ............................. B01J 23/40; B01J 8/02; C01B 21/00
(52) U.S. Cl. .................. 502/326; 423/213.5; 423/213.7; 423/239.1; 423/239.2; 502/325
(58) Field of Search ........................... 423/213.5, 213.7, 423/234.1, 239.2; 502/325, 326

(56) References Cited

U.S. PATENT DOCUMENTS

| | | | |
|---|---|---|---|
| 5,041,270 A | * 8/1991 | Fujitani et al. | 423/213.2 |
| 5,376,610 A | * 12/1994 | Takahata et al. | 502/66 |
| 5,610,117 A | * 3/1997 | Horiuchi et al. | 502/324 |
| 5,804,155 A | * 9/1998 | Farrauto et al. | 423/239.2 |
| 5,804,526 A | 9/1998 | Satoh et al. | 502/304 |
| 5,849,255 A | * 12/1998 | Sawyer et al. | 423/213.5 |
| 5,911,961 A | * 6/1999 | Horiuchi et al. | 423/213.5 |
| 5,958,826 A | 9/1999 | Kurokawa et al. | 502/303 |
| 6,350,416 B2 | * 2/2002 | Noda et al. | 422/171 |
| 6,395,675 B1 | * 5/2002 | Suga et al. | 502/326 |
| 6,517,785 B2 | * 2/2003 | Noda et al. | 422/180 |

FOREIGN PATENT DOCUMENTS

| | | | |
|---|---|---|---|
| EP | 0 749 774 A2 | 12/1996 | B01D/53/94 |
| EP | 0 984 142 A1 | 3/2000 | F01N/3/02 |
| JP | 05137963 | * 6/1993 | B01D/53/36 |
| JP | 07047227 | * 2/1995 | B01D/53/56 |
| JP | 8-281110 | 10/1996 | B01J/23/89 |
| JP | 8-281111 | 10/1996 | B01J/23/89 |
| JP | A957093 | * 3/1997 | B01J/20/06 |

* cited by examiner

Primary Examiner—Stanley S. Silverman
Assistant Examiner—Jonas N. Strickland
(74) Attorney, Agent, or Firm—Fish & Richardson P.C.

(57) ABSTRACT

An exhaust gas purifying catalyst including a catalyst component containing a refractory inorganic oxide carrying a platinum family metal, a nitrogen oxide adsorbent, and a hydrocarbon adsorbent and a catalyst component for the purification of nitrogen oxide and a method for the purification of an exhaust gas by the use of the catalyst.

18 Claims, 3 Drawing Sheets

EXHAUST GAS PURIFYING CATALYST AND METHOD FOR PURIFYING EXHAUST GAS

BACKGROUND OF THE INVENTION

1. Field of the Invention

This invention relates to an exhaust gas purifying catalyst and a method for the purification of exhaust gas. More particularly, it relates to a method for catalytically reducing harmful substances, particularly nitrogen oxides ($NO_x$), contained in the exhaust gas with a hydrocarbon as a reducing agent, an exhaust gas purifying catalyst capable of adsorbing simultaneously the hydrocarbon and $NO_x$ in the exhaust gas thereby decomposing and reducing $NO_x$ in a wide temperature range without introducing any hydrocarbon by way of replenishment from the external source, and a method for the purification of the exhaust gas by the use of the catalyst.

2. Description of Related Art

The $NO_x$ in the atmospheric air causes photochemical smog and acid precipitation. Thus, the emission of $NO_x$ from mobile generative sources such as automobiles that are furnished with internal combustion engines such as gasoline and diesel engines, which form one of the generative sources for $NO_x$, has become one of the serious social issues. Official studies are now under way with a view to rigidifying legal regulations on the tolerance of $NO_x$ emission in the future. In the light of the demand of such social cause, efforts are being promoted with a view to developing an exhaust gas purifying catalyst.

As the catalyst capable of purifying the exhaust gas of a gasoline engine, the so-called three-way catalyst, i.e. a catalyst capable simultaneously reducing $NO_x$, unburnt hydrocarbon, and carbon monoxide, has been heretofore used. The three-way catalyst, when the ordinary gasoline engine is used and the exhaust gas therefrom contains substantially no oxygen, is capable of efficiently reducing $NO_x$ with the unburnt hydrocarbon and the carbon monoxide in the exhaust gas.

The exhaust gas from the diesel engine contains oxygen in great excess on account of the special quality of the engine, and theoretically has small contents of hydrocarbon and carbon monoxide as a reducing agent for $NO_x$. When the ordinary three-way catalyst is used, it is nearly incapable of reducing $NO_x$ for the treatment of exhaust gas from the diesel engine.

In recent years, gasoline engines of type of a lean burn and an in-cylinder fuel injection system have been developed. Since these engines operate by lean burn of the fuel, their exhaust gases contain oxygen in high concentrations. When the ordinary three-way catalyst is used, it purifies $NO_x$ with difficulty for the treatment of such an exhaust gas of engines.

JP-A-63-100919 proposes a catalyst having copper deposited on such a porous carrier as zeolite and JP-A-5-137963 proposes a method using platinum as a main catalyst as respects the exhaust gas purifying catalyst effective in the removal $NO_x$ in the exhaust gas containing oxygen copiously such as the exhaust gas of a diesel engine or a lean burn gasoline engine.

These methods heretofore proposed have, as conditions for attaining efficient decomposition of $NO_x$, the point that at least the temperature is limited in a comparatively narrow range and the point that the amount of the hydrocarbon as a reducing agent is comparatively large. These conditions are not easily applied to the actual exhaust gas that varies with the kind of engine and the conditions of travel.

Not only the copper and platinum type catalysts mentioned above but also the catalyst in general is incapable of purifying $NO_x$ unless the catalyst bed is heated to a certain degree by the exhaust gas from the engine. In the diesel engine whose exhaust gas has a comparatively low temperature, it is extremely difficult for the conventional technique to purify $NO_x$ that is generated from immediately after the start of the engine through the duration of idling and low-speed travel.

From this view, a $NO_x$ adsorbent that is not appreciably affected by the exhaust gas temperature and the gas composition as compared with $NO_x$ purifying catalyst has been proposed. Specifically, JP-A-9-57093 discloses an adsorbent having nickel oxide and copper oxide as main components and aimed at the $NO_x$ contained in the atmospheric air or in various kinds of roadside exhaust gas, and JP-A-7-47227 discloses an adsorbent having iron oxide hydrate as a main component and aimed particularly at $NO_x$ contained in the exhaust gas in an automobile tunnel or an indoor parking lot. The $NO_x$ adsorbents thus proposed, however, have limited capacities for adsorption, are incapable of being continuously used and needed regeneration as an indispensable condition. Further, these $NO_x$ adsorbents are generally used under conditions such as a fixed temperature and a gas composition variable only sparingly. Even when $NO_x$ adsorbent is used on the exhaust gas from a diesel engine, since the exhaust gas is always in a lean atmosphere, the desorption of $NO_x$ by the reducing gas and the regeneration of the reducing agent by purification cannot be hoped for. Further, since $NO_x$ adsorbent has the behavior of adsorption and desorption of $NO_x$ largely depending on temperature, it entails the problem that $NO_x$ adsorbed in a low temperature range, on exposure to a high temperature, is inevitably desorbed without being purified.

SUMMARY OF THE INVENTION

This invention has been produced in view of the conventional problems mentioned above.

An object of the present invention is to provide an exhaust gas purifying catalyst capable of efficiently removing $NO_x$ in the exhaust gas of diesel engine that usually retains a lean atmosphere, has a small content of hydrocarbon as a reducing gas, and is under a low temperature.

Another object of the present invention is to provide a method for purifying the exhaust gas by the use of this catalyst.

We have pursued various studies one after another in search of an exhaust gas purifying catalyst with a view to accomplishing the object described above, and have found that the problems mentioned above can be solved by combining a refractory inorganic oxide carrying thereon a platinum family metal, a catalyst containing a $NO_x$ adsorbent and a hydrocarbon (HC) adsorbent, and a $NO_x$ purifying catalyst. This invention has been perfected as a result.

The object of this invention are accomplished by an exhaust gas purifying catalyst that is characterized by combining a first catalyst component containing a refractory inorganic oxide carrying thereon a platinum family metal, a $NO_x$ adsorbent, and a HC adsorbent and a second catalyst component of a $NO_x$ purifying catalyst.

Another object of this invention is accomplished by a method for the purification of an exhaust gas, characterized by forwarding an exhaust gas having a hydrocarbon and a $NO_x$ at a molar ratio (hydrocarbon: nitrogen oxide) in the range of 0.1 to 2:1 into contact with the catalyst above.

According to the invention, in the method for catalytic reduction of the harmful substances, particularly $NO_x$, contained in the exhaust gas with a hydrocarbon as a reducing agent, it is capable of adsorbing simultaneously HC and $NO_x$ in the exhaust gas thereby decomposing or reducing $NO_x$ in a wide temperature range without introducing a large amount of a hydrocarbon by way of replenishment from the external source. It is particularly effective in reducing HC and $NO_x$ in low catalyst temperatures as when the engine is started.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings.

DESCRIPTION OF THE PREFERRED EMBODIMENTS

Figure 1:
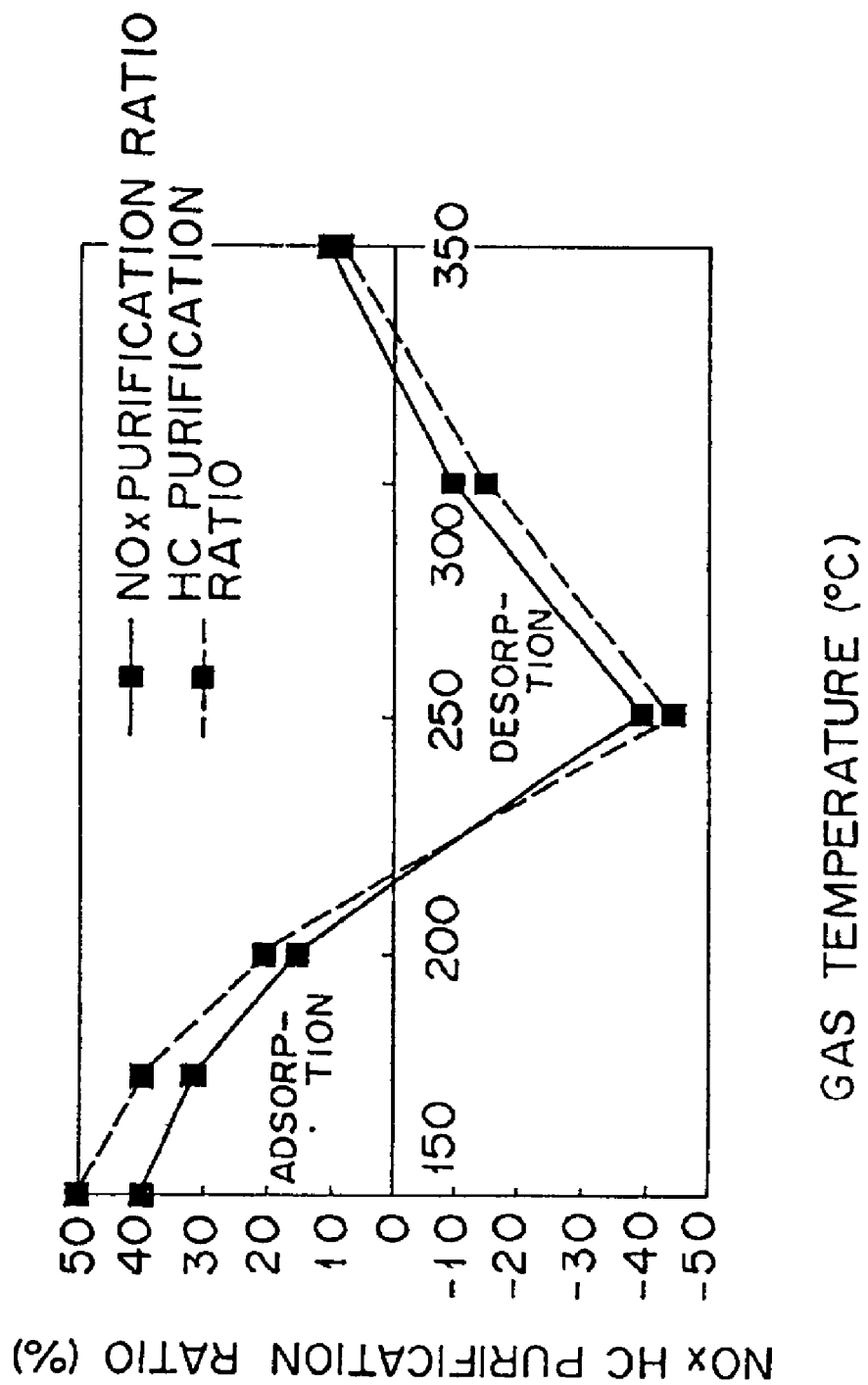
FIG. 1 is a graph showing the special quality of adsorption and emission of $NO_x$ and HC demonstrated by the catalyst in Comparative Example 1.

This invention uses a nitrogen oxide ($NO_x$) adsorbent and a hydrocarbon (HC) adsorbent, and is capable of effectively reducing the harmful substances in the exhaust gas by adsorbing $NO_x$ and HC when the catalyst temperature is low as during the course extending from immediately after the start of engines through the phase of idling. Further, when the temperature is high, since the adsorbed $NO_x$ and HC are desorbed, $NO_x$ can be effectively reduced with the $NO_x$ purifying catalyst utilizing the desorbed HC as a reducing agent.

Now, this invention will be described more specifically below.

The $NO_x$ adsorbent is a main component forming a first catalyst component, and commendable to use nickel oxide or $\alpha$-hydrated iron oxide. Though nickel oxide occurs in various states, it is chiefly sole $Ni_2O_3$ or a mixture of NiO and $Ni_2O_3$. For this invention, the presence of $Ni_2O_3$ is indispensable from the viewpoint of the quality of $NO_x$ adsorption. If nickel oxide formed solely of NiO is used, the produced catalyst will not acquire a satisfactory ability to adsorb $NO_x$. Then, the decomposition temperature of $Ni_2O_3$ is 350° C. When nickel oxide is adopted as a $NO_x$ adsorbent, it is commendable to use this catalyst at a temperature below the decomposition temperature. The hydrated iron oxide is known in three kinds, $\alpha$, $\beta$, and $\gamma$, which differ in crystal structure. The variations that have respective $OH^-$ ions and $O^{2-}$ ions arranged characteristically on the crystal faces thereof may be cited. The hydrated iron oxide is thermally instable and, on being exposed to an elevated temperature, becomes stable as iron oxide ($Fe_2O_3$) with release of water. When the hydrated iron oxide is adopted as a $NO_x$ adsorbent, it is commendable to use this adsorbent at a temperature of not higher than 500° C. In this invention, the $\alpha$-hydrated iron oxide is used favorably.

The amount of the $NO_x$ adsorbent to be used may comprise from 10 to 100 g, as reduced to oxide, per liter of the catalyst. If this amount falls short of 10 g, the shortage will be at a disadvantage in exhibiting an insufficient ability to adsorb $NO_x$ and, as a result, narrowing the temperature range which allows $NO_x$ purification. Conversely, if the amount exceeds 100 g, the excess will proportionately add to the amount of $NO_x$ to be adsorbed but will nevertheless be at a disadvantage in unduly increasing the amount of $NO_x$ to be desorbed when the temperature of the exhaust gas is elevated. The $NO_x$ purifying catalyst, therefore, does not purify them fully but rather suffers the ability to purify $NO_x$ to decline. When this material is slurried, the produced slurry entails degradation of its quality.

The HC adsorbent that forms the first catalyst component is preferred to be zeolites. It is commendable for the zeolites to have a high ability to adsorb hydrocarbon and excel in heat resistance. Examples of the zeolites may include Pentasil type zeolite, Y type zeolite, mordenite, and ferrierite. The amount of HC adsorbent to be used may comprise from 10 to 100 g per liter of the catalyst. If the amount falls short of 10 g, the shortage will be at a disadvantage in preventing the adsorbent from manifesting a satisfactory ability to adsorb the hydrocarbon. Conversely, if the amount exceeds 100 g, the excess will proportionately increase the amount of the hydrocarbon to be adsorbed but will be nevertheless at a disadvantage in preventing the $NO_x$ purifying catalyst from acquiring a proportionate exaltation of the ability thereof. When the material is slurried, the produced slurry will degrade its quality.

The platinum family metal contained in the first catalyst component is at least one member selected from the group consisting of platinum, palladium, rhodium and mixtures thereof. Platinum and palladium prove particularly favorable from the viewpoint of the treatment of $NO_x$. Such a metal is generally used as deposited on the powder of a refractory inorganic oxide such as alumina, silica, silica-alumina, zirconia, titania, and zeolite which have a large specific surface area. Titania proves particularly advantageous from the viewpoint of heat resistance. The deposition of Noble metal on the powder is accomplished by adopting any of suitable known methods such as ion exchange or impregnation method. The amount of the platinum family metal to be used is not restricted but may be fixed depending on the kind of metal to be used and the reaction conditions under which the catalyst is placed. It may comprise from 0.001 to 1 g, preferably from 0.01 to 0.5 g, as reduced to metal, per liter of the catalyst. If the amount falls short of 0.001 g, the shortage will be at a disadvantage in preventing the catalyst to acquire an unsatisfactory ability to oxide and entailing the problem of coking. Conversely, if the amount exceeds 1 g, the excess will promote the combustion of the hydrocarbon and inevitably degrade the $NO_x$ purification ratio because of the insufficient supply of the hydrocarbon necessary for the $NO_x$ purification.

Then, the amount of the refractory inorganic oxide to be used may comprise from 2 to 50 g, preferably from 5 to 20 g per 1 g of the platinum family metal. If this amount falls short of 2 g, the shortage will be at a disadvantage in inducing insufficiency of dispersibility during colorization. Conversely, if this amount exceeds 50 g, the excess will be at a disadvantage in aggravating the property.

A second catalyst component for the $NO_x$ purification is not restricted so long as it begins to purify $NO_x$ from a low temperature upward. The catalyst that is formed by depositing a Pt material on a porous inorganic oxide such as zeolites proves advantageous. The zeolite is preferred to manifest high activity after ion-exchanging Pt and excels in heat resistance. Examples of the zeolites may include Pentasil type zeolite, Y type zeolite, mordenite, and ferrierite. Further, when a porous inorganic oxide such as zeolites is deposited on a refractory three-dimensional structure, it is commendable to use an inorganic binder such as silica sol to create firm adhesion in the interface in an appropriate amount, preferably in the range of 0.01 to 0.5 g as a solid component per g of the zeolite.

The amount of the first catalyst component may comprise from 10 to 250 g per liter of the catalyst.

The amount of the second catalyst component may comprise from 10 to 300 g, preferably from 50 to 150 g, per liter of the catalyst. The amount of Pt contained therein is generally in the range of 0.01 to 2 g, preferably in the range of 0.1 to 1 g, per liter of the catalyst. If this amount falls short of 0.01 g, the shortage will be at a disadvantage in causing only an insufficient reaction between $NO_x$ and the hydrocarbon and consequently attaining no sufficient ratio of $NO_x$ purification. Conversely, if this amount exceeds 2 g, the excess will be at a disadvantage in promoting the combustion of the hydrocarbon and inevitably degrading the $NO_x$ purification ratio.

In this invention, these first and second catalyst components may be used as deposited on a refractory three-dimensional structure.

The refractory three-dimensional structure may include an integrally molded honeycomb structure such as a honeycomb carrier, a monolithic honeycomb carrier, a metal honeycomb carrier, and a plug honeycomb carrier.

The monolithic carrier may be what is generally called a honeycomb carrier. Particularly, honeycomb carriers using cordierite, mullite, α-alumina, zirconia, titania, titanium phosphate, aluminum titanate, betalite, spodumene, aluminosilicate, and magnesium silicate as raw materials prove favorable. Those made of cordierite proves especially advantageous. Besides, the refractory three-dimensional structures formed of antioxidant refractory metals such as stainless steel and Fe-Cr-Al alloy are also usable.

The monolithic carrier may be produced by methods of extrusion molding or tightly rolling a sheet-like element. The gas-passing openings (cells) in the monolithic carrier may be in a hexagonal, rectangular, triangular, or corrugated shape. For satisfactory service of the monolithic carrier, the cell density (the number of cells per unit cross-sectional area, 6.45 cm² (1 square inch)) may be in the range of 100–600 cells, preferably in the range of 200–500 cells.

The term "catalyst" as used in this invention embraces one or a combination of a plurality of (catalyst elements) having the first catalyst component and/or the second catalyst component deposited on the structure. The catalyst element may include one formed by depositing both first and second catalyst components on one refractory three-dimensional structure or a combination thereof or one formed by separately depositing both first and second catalyst components on each of the structures and then combining them.

The method for producing the catalyst element is not restricted but may cite any of the known methods. Example of the method for depositing the first and second catalyst components on the structure may include the following method.

As respects the first catalyst component, a powder containing platinum is obtained by immersing the powder of an oxide of titanium in the aqueous solution of a salt of platinum, for example, drying the immersed powder at a temperature of 80° C. to 250° C., and calcining the dried powder at a temperature of 300° C. to 850° C. for a period of 0.5 to 5 hours.

The produced powder, a $NO_x$ adsorbent such as a nickel oxide powder, and a HC adsorbent such as zeolite are slurried by wet pulverizing with a wet pulverizer such as a ball mill. An open flow type honeycomb carrier made of cordierite, as a refractory three-dimensional structure, is immersed in the produced slurry. Subsequently, the honeycomb carrier now wet with the slurry is drained to expel excess slurry and then dried at a temperature of 80° C. to 250° C. for a period of 0.5 to 5 hours.

As respects the second catalyst component, a powder is obtained by immersing a porous carrier such as zeolite in the aqueous solution of a salt of platinum, for example, drying the wet carrier at a temperature of 80° C. to 250° C., preferably of 100° C. to 150° C., and calcining the dried carrier at a temperature of 300° C. to 850° C., preferably of 400° C. to 700° C., for a period of 0.5 to 5 hours, preferably of 1 to 2 hours. When all the oxide powder excepting noble metals is used, it may be subjected, as it is, to the subsequent wet pulverizing step without drying and calcining.

Next, the powder of platinum and zeolite, a binder such as silica sol, and water are wet pulverized with a wet pulverizer such as a ball mill till they form slurry. An open flow type honeycomb made of cordierite, as the refractory three-dimensional structure, is immersed in the produced slurry. The wet honeycomb is drained to expel excess slurry, then dried at a temperature of 80° C. to 250° C., preferably of 100° C. to 150° C., and, when necessary, calcined at a temperature of 300° C. to 800° C., preferably of 400° C. to 700° C., for a period of 0.5 to 3 hours, preferably of 1 to 2 hours.

It is, of course, permissible to prepare slurry containing these first and second catalyst components and then immerse a refractory three-dimensional structure in the slurry obtained.

The catalyst components obtained as described above are not restricted in their disposition or composition. They may be disposed by methods heretofore known to the art, but may include the following methods. (1) The first catalyst component is disposed on the upstream side and the second catalyst component is disposed on the downstream side relative to the flow direction of the exhaust gas. (2) The first and second catalyst components are uniformly mixed and then the produced mixture is applied to the structure. (3) The first catalyst component is made to form the inner layer of a catalyst bed and the second catalyst component to form the outer layer of the catalyst bed. In the above method (1), when the first and second catalyst components are deposited on one refractory three-dimensional structure, namely when one catalyst element is used, the method of deposition may adopted which causes the concentration of the first catalyst component to be gradually lowered from the upstream side through the downstream side relative to the exhaust gas flow and conversely the concentration of the second catalyst component to be gradually heightened. It is, of course, permissible to deposit only the first catalyst component on the upstream side and only the second catalyst component on the downstream side.

When a plurality of refractory three-dimensional structures having both the first and second catalyst components simultaneously or separately deposited thereon are used in combination, namely when a plurality of catalyst elements are used, the method may be adopted which uses the catalyst elements having the first and second catalyst components deposited respectively in varying amounts and disposes the catalyst elements having the first catalyst components deposited in a large amount on the upstream side and the catalyst elements having the second catalyst components deposited in a larger amount on the downstream side respectively relative to the flow direction of the exhaust gas. It is, of course, permissible to adopt the method of disposing the catalyst elements having only the first catalyst component deposited thereon on the upstream side and the catalyst elements having only the second catalyst component deposited thereon on the downstream side, respectively.

The exhaust gas is preferred to be such that the molar ratio of the hydrocarbon to the nitrogen oxide (hydrocarbon: nitrogen oxide) therein is in the range of 0.1 to 2:1. An exhaust gas from diesel engines is preferred. Further, during the purification of exhaust gases, the inlet temperature of the exhaust gas purifying catalyst is preferably adjusted in the range of 100° C. to 500° C.

EXAMPLES

Now, this invention will be described more specifically below with examples and comparative examples. It should be noted, however, that this invention is not limited by these examples.

Example 1

A titania powder (available from Ishihara Sangyo Kaisha, Ltd. in Japan) was immersed with an aqueous dinitrodiamineplatinum solution, dried at 120° C., and then calcined at 500° C. for one hour to obtain a Pt-deposited titania powder (Powder 1). The Pt concentration of this powder was 10 wt. % based on the weight of titania.

A quantity 0.22 g of the resultant Powder 1, 1000 g of a nickel oxide powder (reagent grade, available from Wako Pure Chemical Industries, Ltd. in Japan), 1080 g of a ZSM-5 type zeolite (available from Zeolyst International), and 2000 g of water were ball milled. In the produced slurry, an open flow type honeycomb carrier formed of cordierite (1.0 liter, 400 cells, available from NGK Insulators Ltd. in Japan) as a refractory carrier was immersed. Subsequently, the honeycomb carrier wet with the slurry was drained to expel excess slurry and then dried at 150° C. for two hours. The resulting catalyst element (Catalyst Element 1) contained 0.01 g of Pt, 0.1 g of $TiO_2$, 50 g of nickel oxide, and 50 g of ZSM-5, per liter of carrier.

Separately, 1 kg of an aqueous platinum ammine hydroxide solution (Pt: 1.2 g/liter) was mixed with 1200 g of a zeolite powder, stirred, then filtered and the resultant dried at 80° C. for 12 hours, and subsequently calcined at 500° C. for one hour to afford a Pt ion-exchange zeolite powder (Powder 2). The Pt concentration of this powder was 0.1%.

A slurry was formed by wet pulverizing 1092 g of Powder 2, 544 g of silica sol (solid content 20%) (available from Nissan Chemicals Industries Ltd. in Japan), and 1032 g of water. A honeycomb carrier (supra) was immersed in the produced slurry. The honeycomb carrier wet with the slurry was drained to expel excess slurry and then dried at 150° C. for two hours. The resulting catalyst element (Catalyst Element 2) contained 100.1 g of Pt-ZSM-5 and 10 g of $SiO_2$, per liter of carrier.

Disposing Catalyst Element 1 on the former stage (upstream side) and Catalyst Element 2 on the latter stage (downstream side) formed a catalyst.

Example 2

A quantity 0.22 g of Powder 1, 1000 g of a nickel oxide powder (supra), 1080 g of a ZSM-5 type zeolite (supra), and 2000 g of water were ball milled.

Separately, 1092g of Powder 2, 544 g of silica gel (supra), and 1032 g of water were ball milled.

First, a honeycomb carrier (supra) was immersed to one half in the length direction in the slurry made of Powder 1, nickel oxide, and zeolite. Subsequently the honeycomb carrier wet with the slurry was drained to expel excess slurry and then dried at 150° C. for two hours.

Next, in the slurry formed of Powder 2, the produced carrier was immersed on the opposite side, namely the part carrying no catalyst component. The carrier wet with the slurry was drained to expel excess slurry and dried at 150° C. for two hours. The resulting catalyst element (Catalyst Element 3) contained 0.01 g of Pt, 0.1 g of $TiO_2$, 50 g of nickel oxide, 50 g of ZSM-5, 100.1 g of Pt-ZSM-5, and 10 g of $SiO_2$, per liter of carrier.

Catalyst Element 3 alone was used as a catalyst and the part formed of Powder 1, nickel oxide, and zeolite was disposed on the upstream side, and the part formed of Powder 2 disposed on the downstream side.

Example 3

A quantity 1.1 g of Powder 1, 500 g of a nickel oxide powder (supra), 540 g of a ZSM-5 type zeolite, 2000 g of water, and 1001 g of Powder 2 were ball milled. A honeycomb carrier (supra) was immersed in the resultant slurry. The honeycomb carrier now wet with the slurry was drained to expel excess slurry and then dried 150° C. for two hours. The resulting catalyst element (Catalyst Element 4) contained 0.01 g of Pt, 0.1 g of $TiO_2$, 50 g of nickel oxide, 50 g of ZSM-5, and 100.1 g of Pt-ZSM, per liter of carrier.

Catalyst Element 4 alone was used as a catalyst.

Example 4

A quantity 1092 g of Powder 2, 544 g of silica sol (supra), and 1032 g of water were ball milled. Catalyst Element 1 was immersed in the resultant slurry. Subsequently, Catalyst Element 1 now wet with the slurry was drained to expel excess slurry and then dried 150° C. for two hours. The resulting catalyst element (Catalyst Element 5) contained 0.01 g of Pt, 0.1 g of $TiO_2$, 50 g of nickel oxide, and 50 g of ZSM-5 as an inner layer side and 100.1 g of Pt-ZSM and 10 g of $SiO_2$ as an outer layer side respectively, per liter of carrier.

Catalyst Element 5 alone was used as a catalyst.

Example 5

A catalyst was prepared according to the procedure of Example 1 (Catalyst Element 1) while changing the amount of nickel oxide to 200 g. The resulting catalyst element (Catalyst Element 6) contained 0.01 g of Pt, 0.1 g of $TiO_2$, 10 g of nickel oxide, and 50 g of ZSM-5, per liter of carrier.

Disposing Catalyst Element 6 on the former stage and Catalyst Element 2 on the latter stage formed a catalyst.

Example 6

A catalyst was prepared according to the procedure of Example 1 (Catalyst Element 1) while changing the amount of the ZSM-5 type zeolite to 216 g. The resulting catalyst element (Catalyst Element 7) contained 0.01 g of Pt, 0.1 g of $TiO_2$, 50 g of nickel oxide, and 10 g of ZSM-5, per liter of carrier.

Disposing Catalyst Element 7 on the former stage and Catalyst Element 2 on the latter stage formed a catalyst.

Example 7

A catalyst was prepared according to the procedure of Example 1 (Catalyst Element 1) while changing the amount of nickel oxide to 200 g and the amount of the ZSM-5 type zeolite to 216 g, respectively. The resulting catalyst element (Catalyst Element 8) contained 0.01 g of Pt, 0.1 g of $TiO_2$, 10 g of nickel oxide, and 10 g of ZSM-5, per liter of carrier.

Disposing Catalyst Element 8 on the former stage and Catalyst Element 2 on the latter stage formed a catalyst.

Example 8

A catalyst was prepared according to the procedure of Example 1 (Catalyst Element 1) while using α-hydrated iron oxide instead of the nickel oxide. The α-hydrated iron oxide was prepared in accordance with the report (Ishikawa et al., Journal of Japan Chemical Society, 91, 935, 1970). Specifically, the α-hydrated iron oxide was obtained by completely dissolving 120 g of iron sulfate (the reagent grade, available from Wako Pure Chemical Industries Ltd. in Japan) in 500 ml of deionized water, gradually adding dropwise an aqueous 1.5 mol/L sodium hydroxide solution (the reagent grade, available from Wako Pure Chemical Industries Ltd. in Japan) to the aqueous iron sulfate solution, adjusting the produced solution to a pH of about 3, changing the temperature of the solution to about 50° C., allowing the solution to remain in a stirred state for about 30 hours, separating the produced precipitate by filtration, thoroughly washing the separated precipitate with water, and drying the washed precipitate at 120° C.

The resulting catalyst element (Catalyst Element 9) contained 0.01 g of Pt, 0.1 g of $TiO_2$, 10 g of α-hydrated iron oxide, and 50 g of ZSM-5, per liter of carrier.

Disposing Catalyst Element 9 on the former stage and Catalyst Element 2 on the latter stage formed a catalyst.

Example 9

A catalyst was prepared according to the procedure of Example 3 (Catalyst Element 4) while using α-hydrated iron oxide instead of the nickel oxide. The resulting catalyst element (Catalyst Element 10) contained 0.01 g of Pt, 0.1 g of $TiO_2$, 50 g of α-hydrated iron oxide, 50 g of ZSM-5, and 100.1 g of Pt-ZSM, per liter of carrier.

Catalyst Element 10 alone was used as a catalyst.

Example 10

A catalyst was prepared according to the procedure of Example 4 (Catalyst Element 5) while using α-hydrated iron oxide instead of the nickel oxide. The resulting catalyst element (Catalyst Element 11) contained 0.01 g of Pt, 0.1 g of $TiO_2$, 50 g of α-hydrated iron oxide, and 50 g of ZSM-5 on the inner side layer and 100.1 g of Pt-ZSM and 10 g of $SiO_2$ on the outer side layer, respectively per liter of carrier.

Catalyst Element 11 alone was used as a catalyst.

Comparative Example 1

Catalyst Element 1 alone was used as a catalyst.

Comparative Example 2

Catalyst Element 2 alone was used as a catalyst.

Comparative Example 3

A catalyst was prepared according to the procedure of Example 1 (Catalyst Element 1) while omitting the ZSM-5 type zeolite. The resulting catalyst element (Catalyst Element 12) contained 0.01 g of Pt, 0.1 g of $TiO_2$, and 50 g of nickel oxide, per liter of carrier.

Disposing Catalyst Element 12 on the former stage and Catalyst Element 2 on the latter stage formed a catalyst.

Comparative Example 4

A catalyst was prepared according to the procedure of Example 1 (Catalyst Element 1) while omitting the nickel oxide. The resulting catalyst element (Catalyst Element 13) contained 0.01 g of Pt, 0.1 g of $TiO_2$, and 50 g of ZSM-5, per liter of carrier.

Disposing Catalyst Element 13 on the former stage and Catalyst Element 2 on the latter stage formed a catalyst.

Comparative Example 5

A catalyst was prepared according to the procedure of Example 1 (Catalyst Element 1) while omitting Powder 1. The resulting catalyst element (Catalyst Element 14) contained 50 g of nickel oxide and 50 g of ZSM-5, per liter of carrier.

Disposing Catalyst Element 14 on the former stage and Catalyst Element 2 on the latter stage formed a catalyst.

Example 10

The catalysts obtained in the examples and the comparative examples described above were tested for the ability to purify the exhaust gas by the following method.

In the test, a supercharging antechamber combustion type diesel engine (4 cylinders, 2.8 L) was used as the internal combustion engine, and light oil having a sulfur content of 0.05 wt. % used as the fuel for the internal combustion engine.

First, a given exhaust gas purifying catalyst was set at place in an exhaust gas tube connected to the diesel engine mentioned above and a temperature elevation test from 150° C. to 350° C. (20° C./min) was carried out by a programmed operation. The programmed operation was performed by the use of an automatic engine-operating device (available from Horiba Seisakusho Ltd. in Japan and sold under the product code of "HERT-381" under the condition of 1500 rpm), with the magnitude of automatic torque varied.

Then, the programmed operation was performed in the absence of the catalyst from the exhaust gas tube. The gas then exhausted from the engine was continuously sampled and analyzed with a continuous gas analyzer to determine $NO_x$ and hydrocarbon contents in the exhaust gas. $NO_x$ was analyzed with a chemical emission spectral analyzer (CLD) and the hydrocarbon with a hydrogen flame ionizing analyzer (NDIR) respectively. The analysis results at various temperatures are shown in Table 1.

TABLE 1

| Gas temperature | 150° C. | 175° C. | 200° C. | 250° C. | 300° C. | 350° C. |
|---|---|---|---|---|---|---|
| Rotational frequency (rpm) | 1500 | ← | ← | ← | ← | ← |
| THC (ppm) | 68 | 60 | 57 | 55 | 35 | 32 |
| NOx (ppm) | 70 | 72 | 82 | 83 | 85 | 95 |
| THC/NOx | 0.97 | 0.83 | 0.70 | 0.66 | 0.41 | 0.34 |

Then, the exhaust gas that had contact with the catalyst was analyzed to determine $NO_x$ and hydrocarbon contents. The purification ratios (the degrees of conversion) of $NO_x$ and hydrocarbon were calculated based on the contents of $NO_x$ and hydrocarbon in the exhaust gas determined in the absence of the catalyst from the exhaust gas tube and the contents of $NO_x$ and hydrocarbon determined in the presence of the catalyst in the exhaust gas tube. Let XO (mol) stand for the content in the exhaust gas in the absence of the catalyst and X1 for the content in the presence of the catalyst, the calculation will be attained by the following formula:

Purification ratio(degree of conversion)(%)={$(XO-X1)/XO$}×100.

The capacity for purifying $NO_x$ (degree of purification) at various temperatures found by the calculation is shown in Table 2.

TABLE 2

| | (Purification ratio, %) | | | | | |
|---|---|---|---|---|---|---|
| | 150° C. | 175° C. | 200° C. | 250° C. | 300° C. | 350° C. |
| Ex 1 | 38 | 30 | 40 | 29 | 12 | 10 |
| Ex 2 | 35 | 25 | 35 | 25 | 10 | 9 |
| Ex 3 | 28 | 20 | 20 | 15 | 8 | 8 |
| Ex 4 | 18 | 15 | 20 | 18 | 10 | 9 |
| Ex 5 | 15 | 12 | 30 | 28 | 13 | 5 |
| Ex 6 | 40 | 30 | 25 | 18 | 14 | 8 |
| Ex 7 | 14 | 13 | 25 | 28 | 14 | 8 |
| Ex 8 | 30 | 25 | 25 | 22 | 12 | 11 |
| Ex 9 | 21 | 16 | 15 | 14 | 10 | 10 |
| Ex 10 | 15 | 12 | 14 | 22 | 10 | 11 |
| Com Ex 1 | 40 | 32 | 15 | -40 | -10 | 10 |
| Com Ex 2 | 5 | 8 | 20 | 30 | 15 | 5 |
| Com Ex 3 | 40 | 28 | 32 | 8 | 6 | 6 |
| Com Ex 4 | 3 | 5 | 18 | 28 | 14 | 5 |
| Com Ex 5 | 32 | 25 | 32 | 25 | 10 | 10 |

Ex: Example
Com Ex: Comparative Example

Figure 2:
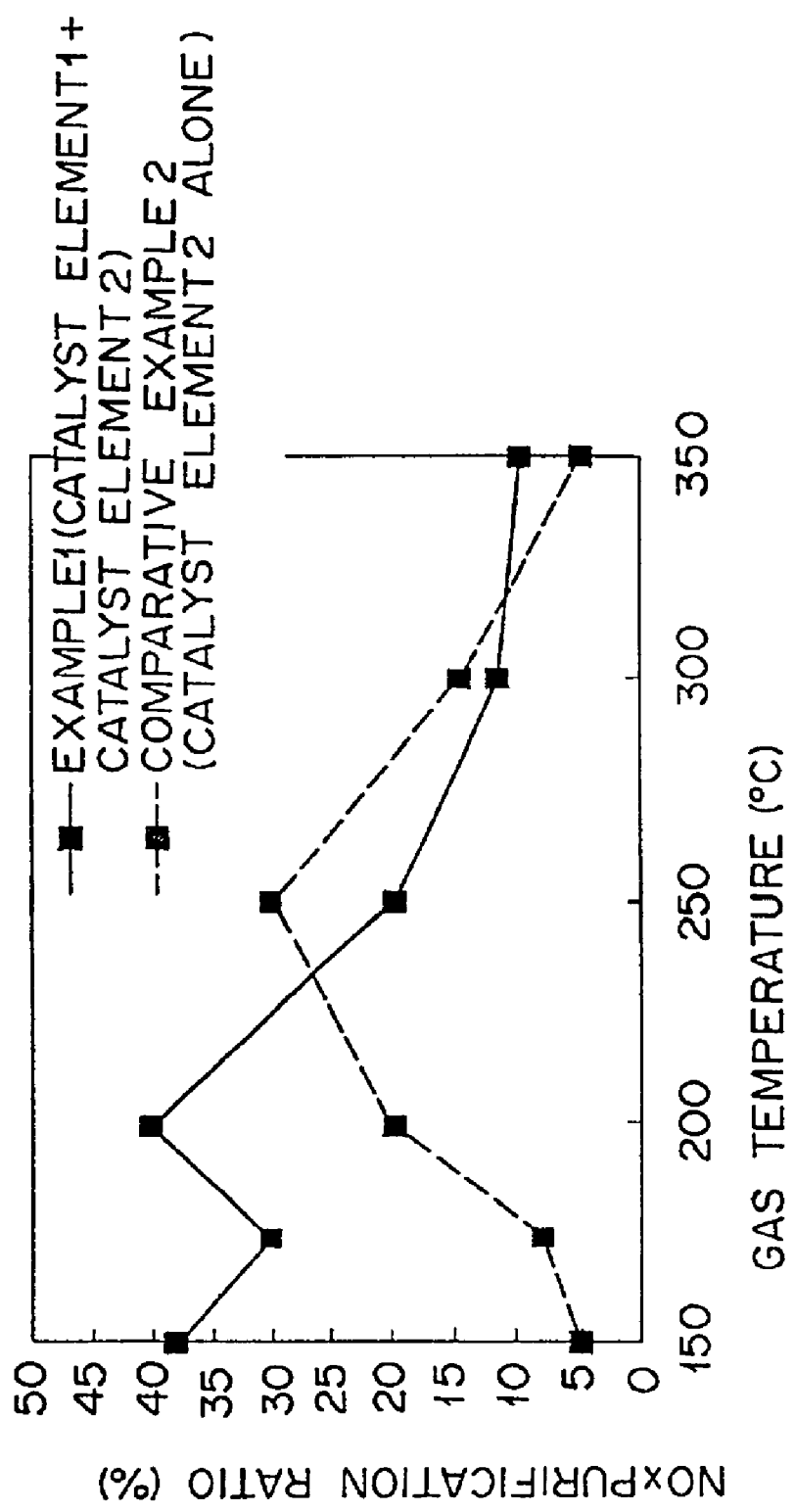
FIG. 2 is a graph showing purification ratios of $NO_x$ demonstrated by the catalysts of Example 1 and Comparative Example 2.

FIG. 1 shows a special property in the adsorption and desorption of $NO_x$ and hydrocarbon when the catalyst formed solely of Catalyst Element 1 obtained in Comparative Example 1 was tested. The data confirm that the catalyst adsorbed the $NO_x$ and the hydrocarbon when the temperature was low, and released the adsorbed $NO_x$ and hydrocarbon simultaneously when the gas temperature rose. The combination of the adsorbent manifesting such special property in the adsorption and desorption of the $NO_x$ and the hydrocarbon with a $NO_x$ purifying catalyst was evidently effective in reducing the $NO_x$ over the range of low, exhaust gas temperature, as compared with the sole use of the $NO_x$ purifying catalyst (FIG. 2).

Figure 3:
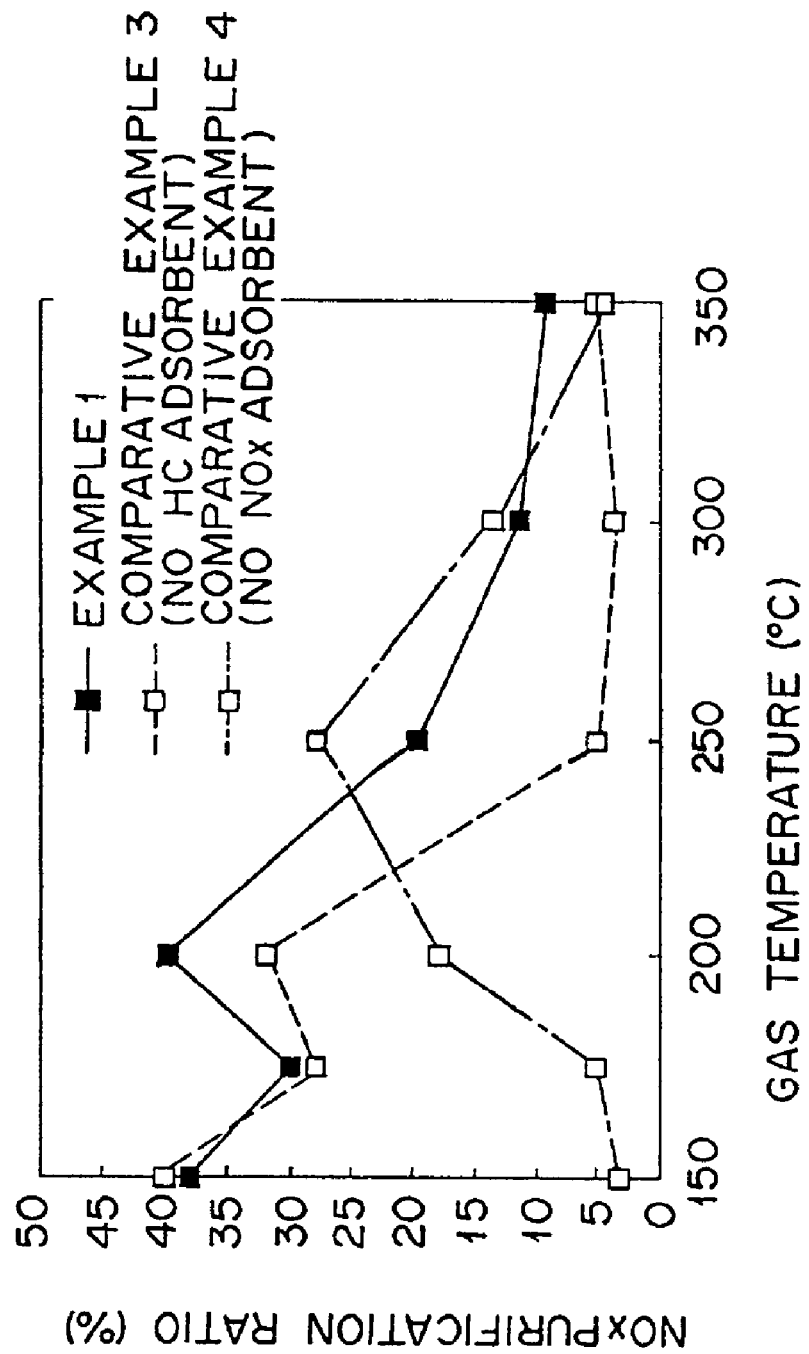
FIG. 3 is a graph showing purification ratios of $NO_x$ demonstrated by the catalysts of Example 1 and Comparative Examples 3 and 4.

FIG. 3 shows the purification ratios of $NO_x$ attained by the catalysts of Example 1 and Comparative Examples 3 and 4. In Comparative Example 3 the hydrocarbon adsorbent was omitted from Example 1, and in Comparative Example 4 the $NO_x$ adsorbent was omitted from Example 1. Comparative Example 3 produced the result of a lower ratio of $NO_x$ purification than Example 1, because the shortage of the hydrocarbon as a reducing agent in the temperature range permitted the $NO_x$ emission. In contrast, Comparative Example 4 produced a low ratio of $NO_x$ purification in low temperatures because the $NO_x$ adsorbent was omitted. These results clearly indicate that the $NO_x$ purification over a wide range of temperature necessitates the combination of a $NO_x$ adsorbent with a hydrocarbon adsorbent.

Incidentally, the amounts of catalyst component deposited were expressed based on the apparent volume of the carrier. They may be substantially equal when they are expressed based on the catalyst.

The entire disclosure of Japanese Patent Application No. 2000–185257 filed on Jun. 20, 2000 including specification, claims, drawings and summary are incorporated herein by reference in its entirety.

What is claimed is:

1. An exhaust gas purifying catalyst system comprising:
    a first catalyst component containing a refractory inorganic oxide carrying a platinum family metal, a nitrogen oxide adsorbent, and a hydrocarbon adsorbent; and
    a second catalyst component for the purification of nitrogen oxide;
wherein said first catalyst component is disposed at a high concentration on the upstream side and said second catalyst component is disposed at a high concentration on the downstream side relative to the flow direction of the exhaust gas.

2. A catalyst system according to claim 1, wherein said first catalyst component said nitrogen oxide adsorbent includes nickel or hydrated iron oxide, said hydrocarbon adsorbent includes zeolite, and said platinum family metal is at least one member selected from the group consisting of platinum, palladium, rhodium and mixtures thereof.

3. A catalyst system according to claim 2, wherein said zeolite is at least one member selected from the group consisting of Pentasil zeolite, Y zeolite, mordenite, ferrierite and mixtures thereof.

4. A catalyst system according to claim 3, wherein said zeolite is at least one member selected from the group consisting of Pentasil zeolite, Y zeolite and a mixture thereof.

5. A catalyst system according to claim 1, wherein said refractory inorganic oxide is at least one member selected from the group consisting of alumina, silica, silica-alumina, zirconia, titania, zeolite and mixtures thereof.

6. A catalyst system according to claim 5, wherein said refractory inorganic oxide is at least one member selected from the group consisting of alumina, silica, silica-alumina and mixtures thereof.

7. A catalyst system according to claim 1, wherein said platinum family metal is at least one member selected from the group consisting of platinum, palladium and a mixture thereof.

8. A catalyst system according to claim 1, wherein an amount of said platinum family metal comprises from 0.001 to 1 g, as reduced to metal, per liter of the catalyst.

9. A catalyst system according to claim 8, wherein the amount of said platinum family metal comprises from 0.01 to 0.5 g, as reduced to metal, per liter of the catalyst.

10. A catalyst system according to claim 1, wherein an amount of the refractory inorganic oxide comprises from 2 to 50 g per 1 g of the platinum family metal.

11. A catalyst system according to claim 10, wherein the amount of the refractory inorganic oxide comprises from 5 to 20 g per 1 g of the platinum family metal.

12. A catalyst system according to claim 1, wherein an amount of said nitrogen oxide adsorbent comprises from 10 to 100 g, as reduced to oxide, per liter of the catalyst.

13. A catalyst system according to claim 1, wherein an amount of said hydrocarbon adsorbent comprises from 10 to 100 g per liter of the catalyst.

14. A catalyst system according to claim 1, wherein an amount of the second catalyst component comprises from 10 to 300 g per liter ofthe catalyst.

15. A catalyst system according to claim 14, wherein the amount of the second catalyst component comprises from 50 to 150 g per liter of the catalyst.

16. A catalyst system according to claim 1, wherein said catalyst is a set of at least two pieces and said first catalyst component is disposed on the upstream side and said second catalyst component on the downstream side respectively relative to the flow direction of the exhaust gas.

17. A catalyst system according to claim 1, wherein the second catalyst component contains a porous inorganic oxide carrying a Pt material.

18. A catalyst system according to claim 17, wherein the porous inorganic oxide is a zeolite.

* * * * *

UNITED STATES PATENT AND TRADEMARK OFFICE
CERTIFICATE OF CORRECTION

PATENT NO.    : 6,893,997 B2
DATED         : May 17, 2005
INVENTOR(S)   : Makoto Horiuchi, Takeshi Matsumoto and Tatsuya Yoshikawa It is certified that error appears in the above-identified patent and that said Letters Patent is hereby corrected as shown below:

<u>Title page,</u>
Item [73], Assignee, "CT CO., Ltd., Osaka (JP);" should read -- ICT Co., Ltd., Osaka (JP); --.

Signed and Sealed this

Eighteenth Day of October, 2005

JON W. DUDAS
*Director of the United States Patent and Trademark Office*